Aug. 13, 1957　　　　　E. P. SEXTON　　　　　2,802,699
FLUID PRESSURE BRAKE APPARATUS
Filed Nov. 27, 1953
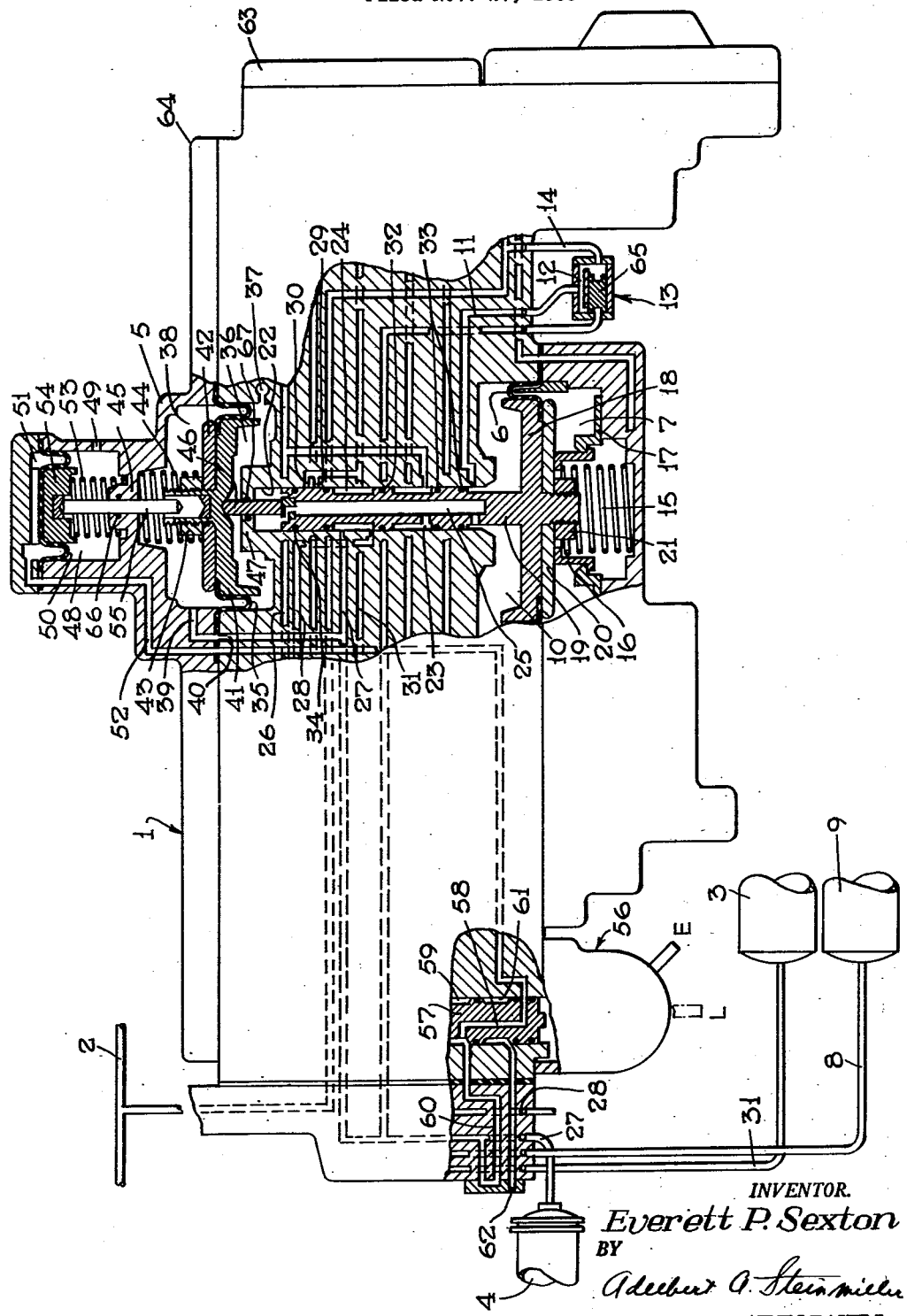
INVENTOR.
Everett P. Sexton
BY
Adelbert A. Steinmiller
ATTORNEY

United States Patent Office

2,802,699
Patented Aug. 13, 1957

2,802,699

FLUID PRESSURE BRAKE APPARATUS

Everett P. Sexton, East McKeesport, Pa., assignor to Westinghouse Air Brake Company, Wilmerding, Pa., a corporation of Pennsylvania Application November 27, 1953, Serial No. 394,704

5 Claims. (Cl. 303—23)

This invention relates to fluid pressure brake equipment for railway vehicles and more particularly to the type adapted to effect application or release of the vehicle brakes in graduated steps according to variations in pressure of fluid in a brake pipe relative to that of a reference pressure.

One object of the invention is the provision of an improved brake controlling valve device of the above type particularly adapted for use on Euorean railway cars.

Another object of the invention is the provision of an improved graduated release type of brake controlling valve device for European service having improved means for selectively reducing the braking power obtained by a given brake pipe reduction for braking an empty vehicle.

Still another object is the provision of a fluid pressure brake equipment of the above type having improved means for limiting the braking power of same to one certain maximum for braking a loaded vehicle and to another lesser maximum for braking an empty vehicle in the event of an over-reduction in brake pipe pressure.

Other objects and advantages will become apparent in the following more detailed description of the invention.

In the accompanying drawing, the single figure is a diagrammatic view, partly in section and partly in outline, of a fluid pressure brake equipment embodying the invention.

Description

As shown in the drawing, the brake equipment embodying the invention comprises a brake controlling valve device 1 adapted to operate in response to a reduction in pressure in a brake pipe 2 to control supply of fluid under pressure from an auxiliary reservoir 3 to a brake cylinder device 4 to apply brakes on a car and adapted to operate in response to charging of said brake pipe with fluid under pressure to charge the auxiliary reservoir with fluid under pressure and at the same time to release fluid under pressure from said brake cylinder device. Such a brake controlling valve device is shown and described in patent application, Serial No. 390,387, filed by Earle S. Cook on November 5, 1953 and assigned to the assignee of the present invention.

The brake controlling valve device 1 comprises a graduated control portion 5 which comprises a diaphragm 6 clamped about its periphery between two sections of a casing and combining with said casing to define at one side a chamber 7 which is connected by way of a passage and pipe 8 to a control reservoir 9 and at the other side a chamber 10 which is normally open to brake pipe 2 through a passage and pipe 11, a passage 12 in a double check valve device 13, and a pipe and passage 14. A spring 15 is mounted in chamber 7 between a portion of the casing and a spring seat member 16 slidably guided in a stop member 17. The stop member 17 serves to limit downward deflection of diaphragm 6 against the force of spring 15 caused by an excessive pressure of fluid supplied to chamber 7 from the brake pipe 2.

A diaphragm follower 18 has a stem 19 formed integral therewith in chamber 10 and extends downwardly therefrom, as viewed in the drawing, through a central opening in diaphragm 6 into chamber 7, where it makes screw-threaded connection with a follower plate 20 and locking nut 21 for clamping the central portion of said diaphragm.

Extending upwardly from the follower 18, the follower stem 19 is slidably mounted in a bore 22 formed in the casing and is reduced in diameter at two places to thereby define within said bore annular chambers 23 and 24. Chamber 23 is always open to chamber 10 by way of a longitudinal passage 25 formed in the follower stem 19 and is normally connected to auxiliary reservoir 3 by charging passage 26, an auxiliary reservoir charging check valve (designated at 154 in the drawing of, and described in the specification of, the aforesaid copending application), and passage and pipe 31. It should be understood that, as described in the aforesaid copending application, upon downward movement of diaphragm 6 in response to an excess of brake pipe pressure, as would occur during charging near the front end of the train, communication between brake pipe passage 11 and chamber 10 will be temporarily lapped or tapered off by the follower stem 19. Upon upward movement of diaphragm 6 in response to a reduction in brake pipe pressure, follower stem 19 will close off communication between chamber 23 and reservoir charging passage 26.

Chamber 24 is constantly connected to brake cylinder 4 by way of a connected passage and pipe 27 and is normally connected to atmosphere by way of a passage 28. When a reduction in brake pipe pressure is made to effect an application of the brakes, diaphragm 6 will deflect upwardly carrying chamber 24 upwardly into communication with the auxiliary reservoir 3 by way of a maintaining port 29 and service port 30 which are both connected to auxiliary reservoir 3 through passage and pipe 31. Intermediate the chambers 23 and 24 a sealing ring 32 is slidably mounted between the stem 19 and the wall of the bore 22 to prevent leakage of fluid under pressure between said chambers. A pair of similar sealing rings 33 are mounted in the same manner between chamber 23 and the mouth of passage 11 for the purpose of preventing leakage of fluid under pressure from passage 11 when it is closed off by stem 19 in the manner previously mentioned. A pair of sealing rings 34 are similarly mounted on the upper end of stem 19 so as to bracket ports 29 and 30 to prevent leakage of fluid under pressure from passage 31.

The graduated control portion further comprises a diaphragm 35 clamped about its periphery between two sections of the casing and combining with said casing to define at one side a chamber 36 which is open to atmosphere by way of a vent port 37 and at the other side a chamber 38 which is open through a passage 39, a choke 40 and passage 27 to chamber 24 and to the brake cylinder device 4. It will be understood that an inshot valve device is interposed in passage 27 as shown and described in the aforesaid copending application but since it forms no part of the present invention its illustration and description will be omitted.

The diaphragm 35 is clamped at its center between a follower 41, which extends through a central opening in said diaphragm, and a follower plate 42 and makes screw-threaded connection with a nut 43 in chamber 38. A spring 44 is operably mounted in chamber 38 between a partition wall 45 of the casing and the follower plate 42 for urging, through the medium of a pusher stem 46 slidably mounted in a wall 47 separating bore 22 from chamber 36, the follower stem 19 downwardly toward the position in which it is shown in the drawing. This position is a normal release position and is defined by contact of follower plate 20 with spring seat member 16 supported on spring 15.

The partition wall 45 separates chamber 38 from a chamber 48 which is open to atmosphere through a vent port 49 and is closed at its upper end by a diaphragm 50 clamped on its marginal edge between two sections of the casing. At the side of diaphragm 50 opposite to chamber 48 a chamber 51 is defined by a section of the casing and said diaphragm, which chamber is in open communication with the brake cylinder device 4 by way of a passage 52 and the brake cylinder passage and pipe 27. Contained in the chamber 48 is a spring 53 interposed between a follower 54 for diaphragm 50 and the wall 45. This spring 53 is provided for the purpose of keeping diaphragm 50 in its uppermost position defined by contact with the casing, so that said diaphragm will remain ineffective until approximately ten pounds brake cylinder pressure is developed so that quick service activity will have been completed without being affected by activity of said diaphragm. When fluid pressure in chamber 51 exceeds ten pounds, said diaphragm will deflect downwardly, exerting any force in excess thereof downwardly on follower plate 42 through the medium of a pusher stem 55. This pusher stem 55 is slidably mounted in a suitable opening in the wall 45 for engagement at its upper end by the follower 54 and at its lower end by follower plate 42. The stem 55 is provided with a sealing ring 66 to prevent leakage of fluid under pressure from chamber 38 to atmospheric chamber 48 and stem 46 is provided with a similar sealing ring 67 to prevent leakage of fluid under pressure from bore 22 to atmospheric passage 36.

The brake controlling valve device 1 further comprises a service selector valve device 56 having at least two handle positions, one of which is indicated in a solid line at "E" for obtaining braking on an empty vehicle and another is indicated in a broken line at "L" for obtaining braking for a loaded vehicle. This service selector valve device 56 comprises a piston valve 57 adapted to be positioned as shown in the drawing when the handle position is at "E," in which position passage 52 is connected to brake cylinder passage 27 by way of a passage 58 in the piston valve 57, a chamber 59 and a passage 60. At handle position marked "L" piston valve 57 is shifted downwardly from the position in which it is shown to a position in which a chamber 61 connects passage 52 and therefore chamber 51 to atmosphere by way of an atmospheric passage 62. At the same time passage 52 is cut off from passage 58 which is connected to brake cylinder passage 27.

Operation

Except for specific details, the operation of the graduated control portion 5 will be essentially the same as the operation of the graduated control portion shown and described in a copending patent application, Serial No. 390,387, filed by Earle S. Cook on November 5, 1953, and assigned to the assignee of the present invention. In much the same maner as set forth therein in initial charging fluid at brake pipe pressure in chamber 10, when sufficient to overcome the force of spring 15, will deflect the diaphragm 6 and follower plate 20 downwardly until said plate contacts the stop member 17. In this position of diaphragm 6 and follower stem 19, supply of fluid under pressure from brake pipe 2 by way of passage 14, passage 12 in double check valve device 13 will be closed off by said follower stem while fluid under pressure previously supplied to chamber 10 will flow through passage 25 in follower stem 19, chamber 23, charging passage 26, a check valve (not shown), and passage and pipe 31 to auxiliary reservoir 3. When the pressure differential acting on diaphragm 6 has been sufficiently reduced by this flow and the flow of fluid under pressure to control reservoir 9 and chamber 7 by operation of a charging valve device indicated in outline at 63, spring 15 will actuate diaphragm 6 and diaphragm stem 19 upwardly toward the position in which it is shown in the drawing, in which position fluid will again be supplied to chamber 10 at brake pipe pressure. Also, fluid under pressure, if any, in brake cylinder device 4 will flow to atmosphere by way of passage and pipe 27, chamber 24 and atmospheric passage 28. The final charging of the control reservoir 9 and the auxiliary is effected under the control of the charging valve device 63 and a charging cut-off valve device 64 in a manner fully explained in the aforesaid copending application and its description is not necessary to an understanding of the present invention.

Brake application—empty position

When it is desired to effect an application of the brakes, a reduction in pressure of fluid in brake pipe 2 will be initiated from the brake valve device on the locomotive in the well-known manner. When the pressure of fluid in brake pipe 2 is thus reduced, a corresponding reduction in pressure will occur in chamber 10, and when the pressure in said chamber becomes sufficiently reduced, the control reservoir pressure in chamber 7 will deflect the diaphragm 6, follower stem 19 and diaphragm 35 upwardly against the reduced brake pipe pressure and force of spring 44, causing chamber 24, which as previously noted is always connected to brake cylinder device 4, to first be disconnected from atmospheric passage 28 and then to be connected to auxiliary reservoir 3 by way of ports 29 and 30 and passage and pipe 27. Fluid under pressure thus supplied to brake cylinder passage 27 will also flow by way of choke 40 and passage 39 to diaphragm chamber 38 where it will act on diaphragm 35 in opposition to control reservoir pressure in chamber 10 acting on diaphragm 6. By reason of choke 40 the rate of build-up of pressure in chamber 38 will be substantially the same as that in brake cylinder device 4. Assuming that the reduction in brake pipe pressure effected by operation of the brake valve device is limited to some chosen degree within the bounds of normal operation, then when the pressure obtained in the brake cylinder device 4 is increased to a chosen relation to the degree of brake pipe reduction effective in chamber 10, the brake cylinder pressure acting in chamber 38 will move the diaphragms 6 and 35 and connected follower stem 19 downwardly to an application lap position, in which position said follower stem will again cut off communication between auxiliary reservoir 3 and brake cylinder device 4.

According to this invention, a selection may be made between two different relations of brake cylinder pressure to the degree of brake pipe reduction through the use of the selector valve device 56. One relation may provide a ratio of two and one-half pounds of brake cylinder pressure for each pound of brake pipe reduction. Thus a fifty pound brake cylinder pressure could be obtained by effecting a twenty pound brake pipe reduction. Such a ratio might be established by the operation of the graduated control portion 5 as just described up to this point, or might be established by operation of the graduated control portion disclosed in the aforementioned copending application. In the present invention this ratio may be obtained when the handle position is at "L" and this ratio is thought to establish sufficient braking power for braking a fully-loaded vehicle. In this structure, when the handle position is at "E," as shown in the drawing, the effectiveness of brake cylinder pressure to move the piston stem 19 to application lap position is increased by the addition of the diapragm 50, which may also be subject to brake cylinder pressure and act in cooperation with diaphragm 35 to oppose the control reservoir pressure in chamber 7 acting on diaphragm 6. With this additional diaphragm 50 it is possible to provide a diaphragm relation which may produce one and one-half pounds of brake cylinder pressure for each pound of brake pipe reduction. This ratio of brake cylinder pressure to the degree of brake pipe reduction is thought to provide sufficient force to brake an empty vehicle mixed in a train with loaded vehicles without undue shock or damage to any of the train vehicles.

In operation, with the handle position of the selector valve device 56 at "E," fluid under pressure supplied to the brake cylinder passage 27 will also flow through passage 60 to chamber 59, whence it will flow through passage 58 in the piston valve 57 and passage 52 to chamber 51, where it will act on diaphragm 50 in the same direction as brake cylinder pressure in chamber 38 acting on diaphragm 35. When the pressure of fluid in chamber 51 acting on diaphragm 50 becomes sufficient to overcome the force of spring 53, say approximately ten pounds fluid pressure, said diaphragm will deflect downwardly, actuating the stem 55 downwardly into contact with the follower plate 42 and thereafter assisting diaphragm 35 in moving the follower stem 19 to lap position. Thus, the degree of brake cylinder pressure to be permitted as a maximum for braking an empty vehicle is correspondingly less than the maximum brake cylinder pressure permitted for a loaded vehicle. The selected bias force of spring 53 (illustratively assumed as equivalent to the force exerted by a fluid pressure of 10 p. s. i. acting over the effective area of the diaphragm 50) is sufficient to assure that no thrust will be imposed on diaphragm 35 tending to assist in moving the follower stem 19 to lap position, until after quick service activity has been completed.

It has been assumed up to this point that the degree of brake pipe reduction has been limited to some chosen degree within the bounds of normal operation. Should there be an over-reduction in brake pipe pressure, that is in excess of twenty pounds which would establish fifty pounds brake cylinder pressure, the fifty pound brake cylinder pressure acting on the left-hand side of a check valve 65 in the double check valve device 13 will prevail over the over-reduced brake pipe pressure and actuate said check valve to the right-hand position, as viewed in the drawing, thereby cutting off the connection of brake pipe 2 to chamber 10 and connecting brake cylinder device 4 to said chamber by way of passage and pipe 27, passage 12 in valve device 13 and passage 11. Should there be leakage of brake cylinder fluid thereafter, the graduated control portion 5 will respond more quickly than before to restore brake cylinder pressure through operation of the maintaining port 29 in a manner described in said copending application since at this time diaphragm 6 is also subject to brake cylinder pressure and therefore responsive to leakage in brake cylinder pressure.

With the brake controlling valve device 1 conditioned for braking an empty vehicle, the operation of check valve device 13 as described in the preceding paragraph will occur when the brake pipe pressure has been reduced to approximately forty pounds. The resulting brake cylinder pressure which will, of course, be slightly in excess of forty pounds in order to operate the check valve device 13 is considered not to be dangerously out of proportion for braking an empty vehicle.

*Release of brake application*

In order to effect a release of a brake application and to recharge the brake equipment with fluid under pressure, the brake valve device on the locomotive must be operated to supply fluid under pressure to brake pipe 2. Fluid under pressure supplied to brake pipe 2 will flow through pipe and passage 14 to the right-hand side of check valve 65, whence it will flow through passages 12 and 11 to chamber 10 in the graduated control portion 5 if the check valve 65 is positioned at the left-hand side, as shown in the drawing. If communication between passages 14 and 12 has been cut off by reason of an over-reduction in brake pipe pressure as described above, flow of fluid under pressure from passage 14 to passage 12 will be delayed until the pressure of fluid in passage 14 has increased sufficiently to overcome the opposing brake cylinder pressure of fluid acting on the left-hand end of check valve 65. When the pressure of fluid in chamber 10 is thus increased sufficiently, it, acting on the upper side of diaphragm 6, together with brake cylinder pressure and pressure of spring 44 acting downwardly on diaphragm 35, will create a force which will overcome the opposing force created by control reservoir pressure acting upwardly on diaphragm 6, which will deflect said diaphragms and follower stem 19 downwardly to the position in which they are shown in the drawing. If the handle position of selector valve device is at "E," as shown in the drawing, this downward movement will be aided and advanced by the action of brake cylinder pressure in chamber 51 acting on diaphragm 50 against the force of spring 53. Downward movement will move the several elements to the positions in which they are shown in the drawing, in which positions charging of the equipment will proceed as previously described. With chamber 24 in register with passage 28, fluid under pressure in brake cylinder device 4 will flow to atmosphere by way of pipe and passage 27, chamber 24 and passage 28. With pressure of fluid in passage 27 thus reduced fluid under pressure in chamber 38 will flow through passage 39 and choke 40 to passage 27 and thence to atmosphere as just related. If the selector valve device 56 is positioned for braking an empty vehicle, as shown in the drawing, fluid under pressure in chamber 51 will also flow through passage 27 by way of passage 52, passage 58 in the selector valve device 56, chamber 59 and passage 60 and thence to atmosphere.

*Summary*

From the foregoing it will be seen that with this invention I have provided an improved brake controlling valve device employing novel means for selectively obtaining either one of two different ratios of brake cylinder pressure relative to the degree of brake pipe reduction without adversely affecting quick service activity and for utilizing the excess of brake cylinder pressure over brake pipe pressure in the event of an over-reduction in brake pipe pressure to operate a valve to cut off the brake pipe from a control chamber in said brake controlling valve device and thereby prevent further operation of said device in response to brake pipe reduction.

Having now described the invention, what I claim as new and desire to secure by Letters Patent, is:

1. In a fluid pressure brake apparatus, in combination, a brake pipe, a control reservoir, an auxiliary reservoir, a brake cylinder device, a brake controlling valve device comprising valve means controlling communication between said auxiliary reservoir and said brake cylinder device and a plurality of movable abutments for operating said valve means controlled by fluid at brake pipe pressure acting in conjunction with fluid at the pressure in said brake cylinder device and in opposition to pressure of fluid in said control reservoir, said valve means being movable by said plurality of movable abutments upon a reduction in brake pipe pressure relative to that in said control reservoir to a brake application position in which said auxiliary reservoir is connected to said brake cylinder device and upon brake cylinder pressure effecting a balance in the forces exerted by the aforesaid fluid pressures upon said plurality of movable abutments to a lap position in which said auxiliary reservoir is cut off from said brake cylinder device, movable abutment means having a control pressure chamber and operable in response to pressure of fluid in said control pressure chamber at brake cylinder pressure to urge said valve means to move in the direction of said lap position, selector valve means having one position in which said control pressure chamber is connected to said brake cylinder device and operable to another position in which said control pressure chamber is disconnected from said brake cylinder device and connected to atmosphere, and double check valve means comprising an outlet conduit connected to said plurality of movable abutments, one inlet conduit connected to said brake pipe, and another inlet conduit connected to said brake cylinder device, said check valve means being operative to connect the inlet fluid having the prevailing pressure to said outlet conduit to thereby limit the degree of brake application according to the positioning of said selector valve means.

2. In a fluid pressure brake apparatus, in combination, a brake pipe, a control reservoir, an auxiliary reservoir, a brake cylinder device, a brake controlling valve device comprising valve means controlling communication between said auxiliary reservoir and said brake cylinder device and a plurality of movable abutments for operating said valve means controlled by pressure of fluid in a chamber normally open to said brake pipe acting in conjunction with fluid pressure in said brake cylinder device and in opposition to pressure of fluid in said control reservoir, said valve means being movable by said plurality of movable abutments upon a reduction in pressure of fluid in said chamber relative to that in said control reservoir to a brake application position in which said auxiliary reservoir is connected to said brake cylinder device and upon brake cylinder pressure effecting a balance in the forces exerted by the aforesaid fluid pressures on said plurality of movable abutments to a lap position in which said auxiliary reservoir is cut off from said brake cylinder device and valve means comprising a double check valve subject on one side to an inlet pressure of fluid supplied to said brake pipe and on the opposite side to an inlet pressure of fluid supplied to said brake cylinder device and operative to connect the fluid having the higher inlet pressure to said chamber.

3. In a fluid pressure brake apparatus, in combination, a brake pipe, a control reservoir, an auxiliary reservoir, a brake cylinder device, a brake controlling valve device comprising valve means controlling communication between said auxiliary reservoir and said brake cylinder device and a plurality of movable abutments for operating said valve means controlled by pressure of fluid in a chamber normally open to said brake pipe acting in conjunction with fluid pressure in said brake cylinder device and in opposition to pressure of fluid in said control reservoir, said valve means being movable by said plurality of movable abutments upon a reduction in pressure of fluid in said chamber relative to that in said control reservoir to a brake application position in which said auxiliary reservoir is connected to said brake cylinder device and upon brake cylinder pressure effecting a balance in the forces exerted by the aforesaid fluid pressures on said plurality of movable abutments to a lap position in which said auxiliary reservoir is cut off from said brake cylinder device, and a double check valve device comprising an outlet conduit connected to said chamber, one inlet conduit connected to said brake pipe, and another inlet conduit connected to said brake cylinder device, said check valve means being operative to connect the fluid having the prevailing inlet pressure to said outlet conduit.

4. In a fluid pressure brake apparatus, in combination, a brake pipe; a brake cylinder, an auxiliary reservoir; a control reservoir; means defining a chamber; a brake controlling valve device comprising valve means controlling communication between said auxiliary reservoir and said brake cylinder and also comprising a plurality of movable abutments for operating said valve means and controlled by pressures of fluid in said brake pipe and said brake cylinder acting in opposition to fluid at control reservoir pressure, said valve means being movable by said plurality of movable abutments in response to a reduction in brake pipe pressure to supply fluid under pressure from said auxiliary reservoir to said brake cylinder and in response to attaining a brake cylinder pressure in a certain proportion to the degree of brake pipe reduction, while said chamber is vented, to move said valve means to a lap position in which such supply of fluid under pressure is cut off from said brake cylinder; bias means; movable abutment means subject opposingly to pressure of fluid in said chamber and to pressure of said bias means; said bias means being effective to prevent said movable abutment means from exerting any bias on said valve means so long as pressure in said chamber is less than a certain value corresponding to a value of brake cylinder pressure at which quick service activity will have been completed; said movable abutment means being responsive to pressure of fluid in said chamber above said certain value to provide an additional bias on said valve means, over and above that then exerted on said valve means by brake cylinder pressure then effective in the brake controlling valve device, to thereby increase the bias of said valve means toward said lap position for so influencing operation of said brake controlling valve device as to attain a brake cylinder pressure in a lesser proportion than said certain proportion to the degree of brake pipe pressure reduction; and selector valve means for selectively connecting said chamber to atmosphere or to said brake cylinder.

5. A fluid pressure brake apparatus comprising, in combination, a brake pipe; a brake cylinder; an auxiliary reservoir; a control reservoir; a valve device comprising casing means comprising two casing partitions for providing three separated coaxially arranged bores, valve means reciprocable in said casing means for controlling communication between the auxiliary reservoir and brake cylinder, and three coaxially arranged cooperatively connected movable abutments each reciprocable within one of said bores and constituting a stack for controlling operation of said valve means, the first of said movable abutments being subject at one side to control reservoir pressure and at the opposite side to brake pipe pressure, the second of said movable abutments being subject at its corresponding one side to atmospheric pressure and at its corresponding opposite side to brake cylinder pressure and a light spring bias, resilient means exerting a constant bias pressure on the corresponding one side of the third of said movable abutments which third movable abutment is subject at its corresponding opposite side to fluid pressure in a chamber, said stack being operable by preponderant effect of the forces acting on the respective one sides of said movable abutments in consequence of a chosen reduction in brake pipe pressure relative to control reservoir pressure for carrying the valve means to a brake application position in which it opens the auxiliary reservoir to the brake cylinder and operable by substantial balancing of the opposing forces acting on the stack in consequence of the subsequent increase in brake cylinder pressure and hence in the effect of the forces acting on the respective opposite sides of said movable abutments for carrying said valve means to a lap position in which it terminates supply of auxiliary reservoir fluid to the brake cylinder, said stack being operable with said chamber vented to move said valve means to lap position upon attaining a brake cylinder pressure of a certain proportion to said chosen reduction in brake pipe pressure, and said stack being operable with said chamber charged with fluid at brake cylinder pressure to move said valve means to lap position upon attainment of a brake cylinder pressure of a lesser proportion than said certain proportion to said chosen reduction and corresponding to the combined effects of brake cylinder pressure acting on said second movable abutment and brake cylinder pressure in excess of said constant bias pressure acting on said third movable abutment; and selector valve means for selectively opening said chamber to atmosphere or to said brake cylinder.

References Cited in the file of this patent

UNITED STATES PATENTS

| | | |
|---|---|---|
| 1,936,966 | Kasantzeff | Nov. 28, 1933 |
| 1,989,453 | Kasantzeff | Jan. 29, 1935 |
| 2,088,185 | Borde | July 27, 1937 |